Figure 5:
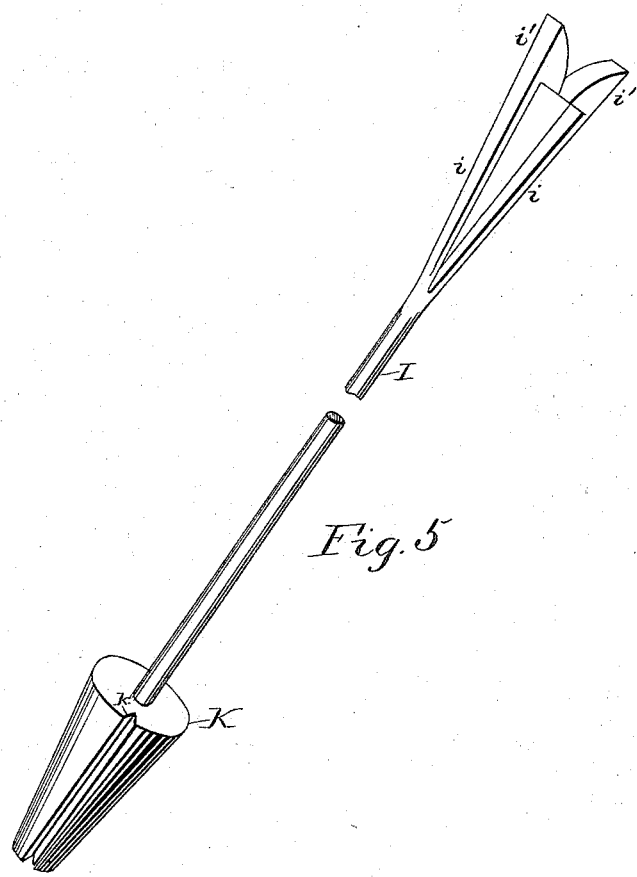

(No Model.) 2 Sheets—Sheet 1.
H. BARTLEY.
MEANS FOR DETECTING LEAKAGE IN GAS MAINS.
No. 330,199. Patented Nov. 10, 1885.
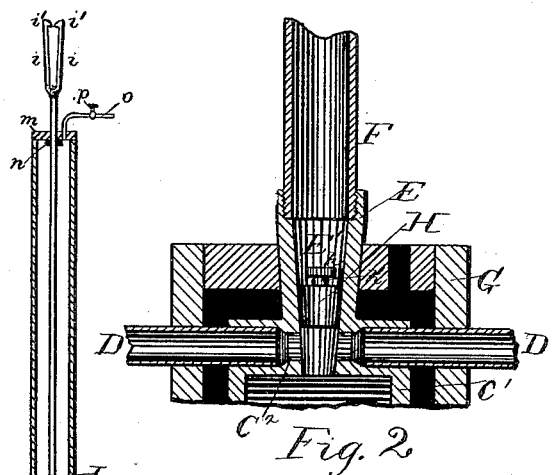
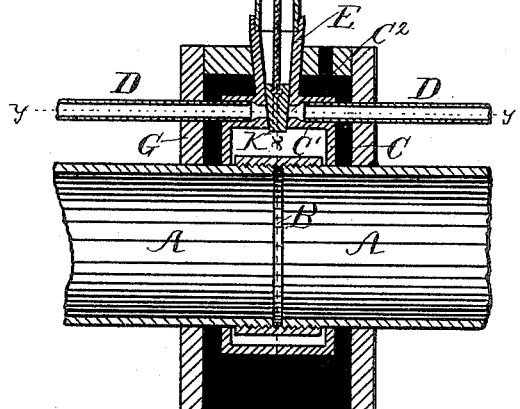
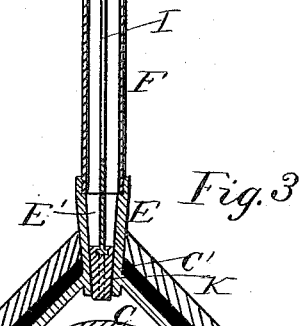
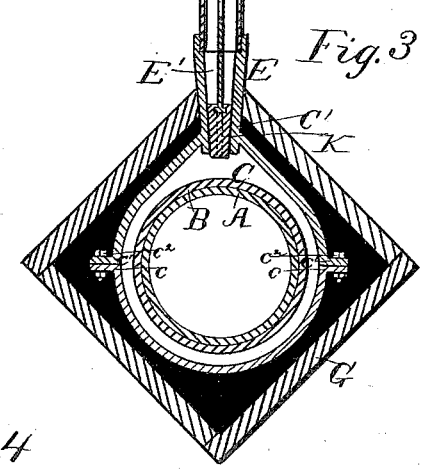
Witnesses
A. A. Moore,
N. N. Connolly
Inventor
Harvey Bartley
by Connolly Bros.
Attorneys (No Model.) 2 Sheets—Sheet 2.

H. BARTLEY.
MEANS FOR DETECTING LEAKAGE IN GAS MAINS.

No. 330,199. Patented Nov. 10, 1885.

Witnesses
A. A. Moore,
A. A. Connolly

Inventor
Harvey Bartley
by Connolly Bros.
Attorneys

UNITED STATES PATENT OFFICE.

HARVEY BARTLEY, OF PITTSBURG, PENNSYLVANIA.

MEANS FOR DETECTING LEAKAGE IN GAS-MAINS.

SPECIFICATION forming part of Letters Patent No. 330,199, dated November 10, 1885.

Application filed September 21, 1885. Serial No. 177,665. (No model.)

*To all whom it may concern:*

Be it known that I, HARVEY BARTLEY, a citizen of the United States, residing at Pittsburg, in the county of Allegheny and State of Pennsylvania, have invented certain new and useful Improvements in Means for Detecting Leakage in Gas-Mains; and I do hereby declare the following to be a full, clear, and exact description of the invention, reference being had to the accompanying drawings, which form part of this specification.

This invention has relation to means for detecting leaks in gas-mains, and relates more particularly to means for detecting leakage at the joints of gas-mains having a casing surrounding the several joints, within which casing the leaking gas escapes, and pipes parallel to the main pipe connecting each of the casings with the next adjacent one—such construction, for instance, as is shown in Letters Patent granted to me May 5, 1885, No. 317,283.

The object of my present invention is to provide means for detecting any leakage which may take place at any of the joints of the conduit, and for determining exactly at what joint such leakage is taking place.

A further object of my invention is to provide means for cutting off the flow of leaking gas from any of the casings on the main to the escape-line, while allowing said leaking gas to escape into the open air.

A still further object of my invention is to provide means for cutting out of the escape-line any desired section or number of sections, while allowing of the free escape of any leaking gas from the casing at either end of the isolated section of the escape-line.

Having these objects in view, my invention consists in the novel construction, combination, and arrangement of parts, as hereinafter described and specifically claimed.

Referring to the accompanying drawings, illustrating my improvements, Figure 1 is a vertical longitudinal section of a portion of a pipe-line, showing a joint inclosed, as in my before-mentioned patent, and with my present improvements added; Fig. 2, an enlarged view of the upper portion of Fig. 1; Fig. 3, a transverse section on the line $x\ x$ of Fig. 1; Fig. 4, a section on the line $y\ y$ of Fig. 1; Fig. 5, a perspective view of the testing-tool.

A A designate adjoining sections of the main pipe of a pipe-line, and B the ordinary screw-threaded sleeve joining the ends of said sections.

C designates the casing which surrounds the joint of the sections A A. Said casing is made, preferably, in two halves, the lower half being semicircular in form and provided with flanges $c$ on each side, through which pass bolts $c^2$, also passing through flanges $c'$ on the upper half of the casing, and thus serving to secure the two halves together. The upper half of the casing C is formed integral with a ridge or riser, C', which is formed with a longitudinal passage, $C^2$, for the reception of the ends of the adjacent sections D D of an escape-line running parallel to the main line A A. A tapering tubular socket, E, is formed integral with the ridge C' and the upper half of the casing, and its central opening, E', which also tapers from the top downwardly, is continued through the lower wall of the passage $C^2$ into the interior of the casing. The upper end of the socket E is internally screw-threaded, and receives the screw-threaded end of a pipe, F, that extends up to and opens above the surface of the ground in which the pipe-line is laid. The casing C is surrounded by a box or exterior covering or casing, G, preferably square in cross-section, and between the casings C and G pitch or cement or other suitable substance is poured, entirely filling the space between, and thereby rendering the escape of any gas from the interior casing impossible, except by way of the opening E' and the escape-pipes D D or the vertical escape-pipe F.

I will here call attention to the fact that there are no screw-joints at any place on the casing C, except the joint of the escape-pipe F and the socket E, such screw-joints being rendered unnecessary by the employment of the exterior casing, and the packing of pitch between said exterior casing and the casing C.

Under ordinary circumstances, and when the line is in good working condition, the escape-pipe F is closed by means of a permanent plug or bung, H, of tapering form and of such size that it will rest in the tapering socket E' at a point above the passage $C^2$. In this condition any leakage which occurs at the joint of the main pipe finds its way through the lower end of the passage E' and the passage C² to the escape-pipes D D, and thence to any desired point, where it is utilized or allowed to waste.

It is to be understood that the appliances described are applied to each joint of a line of pipe, and that at any desired point on the line the plug may be removed from one of the vertical discharge-pipes and the latter used as an escape for the entire line, or that connection can be made at any desired point or points with the horizontal escape-pipes D D and the leaking gas utilized.

In Fig. 5 of the drawings I have illustrated a device which is designed to be used in connection with the devices shown, for the purpose of determining which of the joints of the line is leaking, and for cutting off the escape of the leaking gas from any particular joint to the escape-pipes D D. Said testing device consists of a straight rod, I, to one end of which is attached a tapering plug, K, having longitudinal grooves k k on opposite sides. The other end of the rod I is divided into two or more spring-arms, i i, having at their ends jaws i' i'. The permanent plugs H are formed with knobs h, which are undercut at h', so as to afford a grasping-point for the jaws i i of the clutching device on the end of the rod I. The tapering plug K is of such size that when placed in the tapered socket E' it will fit in the lower end of the same and act as a valve or cock to cut off the passage C² from the interior of the casing C and from the vertical discharge-pipe F.

Operation: When it is desired to test any of the joints of the line, an operative, armed with the device shown in Fig. 5, easily removes the permanent plug H from the socket E', and, reversing his tool I, runs the tapered plug K down to the bottom of the socket. The plug K, being in the position shown in Fig. 1 of the drawings, cuts off communication between the interior of the casing C and the escape-pipes D D, and also cuts off the latter from communicating with the vertical pipe F. Communication is, however, maintained between the vertical pipe F and the interior of the casing C by means of the grooves k k, and the leaking gas, if there be any leaking at the joint, can consequently find its way to the surface. After testing the joint as described, if it is found that the leakage is not sufficient to justify the unearthing of the joint, the temporary plug K is removed and the permanent plug H replaced. Under certain conditions, however, it may be found necessary to cut out, either temporarily or permanently, a section or sections of the escape-pipe D, and it may sometimes be necessary to permanently cut out any one of the joints from communication with the same. In such case I employ tapered and grooved plugs similar to that on the end of the rod I, but provided with knobs on top, like that on the permanent plug H. These plugs may be left in the socket as long as need be, and, when necessary, withdrawn in the same manner as the plug H.

As a measure of precaution, and in order to prevent the danger to the operative which would ensue if the leak at any of the joints were considerable, I employ in connection with the testing-tool I a cap or collar, m, which has a rubber gasket, n, a short section of small pipe, o, and a stop-cock, p, thereon. When testing, this cap is pressed down on the top of the escape-pipe F, and a light being applied to the end of the pipe o, if there be any leakage the gas will be ignited; and if such leakage be great the stop-cock p may be turned, and the flame thereby extinguished. The collar m should, of course, slide easily on the rod I.

Having fully described my invention, I claim—

1. In a device for detecting leakage at the joints of gas-mains, the combination, with a joint of the main line and a casing surrounding said joint having a ridge on top, a horizontal opening running through said ridge and adapted to receive the ends of escape-pipe sections, of a tapering vertical opening running through from the interior of the casing to the exterior of the ridge, and a tapered plug adapted to close said vertical opening, substantially as described.

2. In a device for detecting leaks at the joints of gas-mains, the combination, with a casing surrounding the joint of the main and having horizontal passage in its wall communicating with the ends of escape-pipe sections, and a vertical passage leading from the interior of the casing through the horizontal passage, of a plug having grooves or openings from its top to its bottom, and adapted to fit said vertical passage and cut off communication between it and the horizontal passage and between the sections of the escape-pipe, while allowing communication between the vertical passage and the casing, substantially as described.

3. The combination, with the casing C, having the horizontal passage C² and the tapering socket E, of the tapering plug-valve K, adapted to fit said socket, and having vertical grooves or openings k k, substantially as described.

In testimony that I claim the foregoing I have hereunto set my hand this 19th day of September, 1885.

HARVEY BARTLEY.

Witnesses:
A. A. MOORE,
JOS. B. CONNOLLY.